No. 882,337. PATENTED MAR. 17, 1908.
A. McMURTRIE.
JUNCTION BOX FOR ELECTRICAL CONDUITS.
APPLICATION FILED AUG. 29, 1901.

Witnesses
Ivan Konigsberg
Bert C. Jones

Inventor
Adnah McMurtrie
By his Attorney
Alexander C. Proudfit.

UNITED STATES PATENT OFFICE.

ADNAH McMURTRIE, OF NEW YORK, N. Y., ASSIGNOR TO THOMAS AND BETTS, OF NEW YORK, N. Y., A CORPORATION OF NEW YORK.

JUNCTION-BOX FOR ELECTRICAL CONDUITS.

No. 882,337.     Specification of Letters Patent.     Patented March 17, 1908.

Application filed August 29, 1901. Serial No. 73,692.

*To all whom it may concern:*

Be it known that I, ADNAH McMURTRIE, of New York, N. Y., have invented certain Improvements in Junction-Boxes for Electrical Conduits, of which the following description, in connection with the accompanying drawings, is a specification, like letters on the drawings designating like parts.

This invention relates to systems for the distribution of electricity and more particularly to conduits for wires, my invention having for its object the production of an improved junction or outlet box or like device of special utility for interior work, although I wish it understood that I contemplate its utilization in any field for which it may be applicable by reason of the nature of my improvements. Such boxes or devices are usually embedded in the walls of a building, and to facilitate access, have a mouth flush with the surface of the plaster, which is applied after they are in place, and as the boxes are usually made of cast or pressed metal, the lip around the mouth is usually inclined inward, to facilitate the withdrawal of the box part carrying it when the box part is to be taken from the mold or die. As this inclination offers no means to retain the plaster adjacent the lip when the box is in place, but rather by its very nature facilitates stripping away of the plaster much trouble is experienced from the deterioration of the wall surface adjacent the mouth of boxes, and this is enhanced by the difficulty of arranging the box part carrying the mouth so that a proper depth of plaster can be applied over it. Often, such boxes, especially when used as switch boxes are set askew, through the difficulty found in leveling the base of the box and in bending the conduit so as to enter the box properly.

Among the important features of my invention therefore will be found an adjustable throat, serving as a templet or curb for the plaster, preferably having a lip of plaster-retaining construction, and adjustable to enable exact determination of the depth of plaster, and regulation of the position of the lip so that it shall be flush with the general surface of the wall, and at the right angle.

The various features of my invention will be illustrated and described fully in the accompanying drawings and specification and pointed out in the claim.

Figure 1:
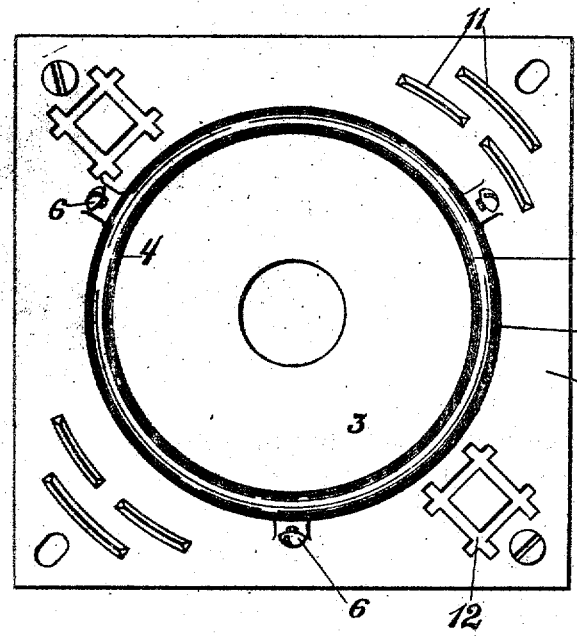
Figure 2:
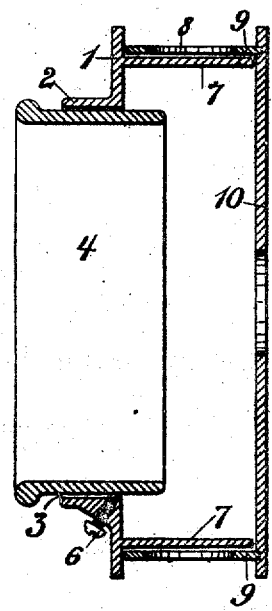
Figure 3:
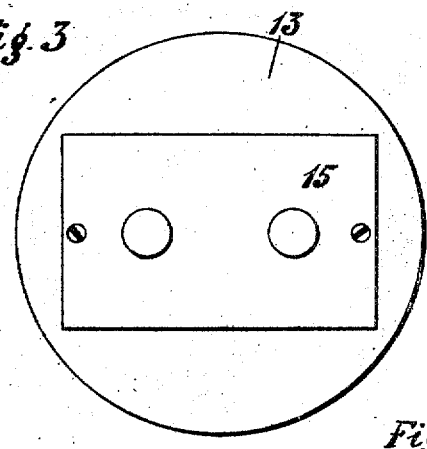
Figure 4:
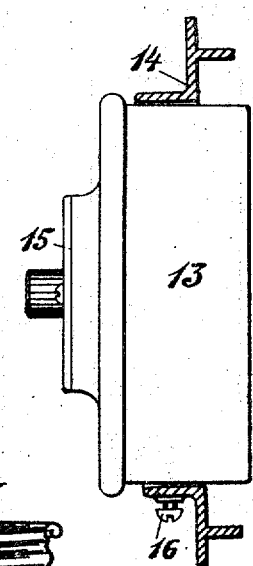
Figure 5:

In the drawings—Figure 1 illustrates in plan view a junction or outlet box in the construction of which my invention has been embodied. Figs. 2 is a view in vertical section of the same; Fig. 3 and 4 are views similar to Figs. 1 and 2, but show a box especially adapted to receive switches; and Fig. 5 illustrates a modified form of throat member.

In the embodiment of my invention selected for illustration and description as a convenient form to enable a ready and accurate understanding of my improvements, the reference numeral 1 designates the top or cover member of what is usually known as a "junction" or "outlet" box, which term I do not use in this description in a restrictive sense but merely as a convenient designation for conduit members filling analogous functions to that of the "junction box" so-called.

The box and cover may be of any suitable material, shape and size, a common material being cast iron, of square shape, as indicated, and when the cover is flat, as illustrated, a rim 2 may be provided as usual, if desired, around the aperture 3, the shape of which aperture may be of circular or other contour. In accordance with my invention, I provide this aperture with an extension throat 4 with a lip of plaster retaining construction 5, the throat member in the instance illustrated taking the form of a cylindrical ring, telescoping within the rim 2, while the plaster retaining construction is secured by an external bead. The surface of the cover member may also be roughened or provided with projections 11, or depressions 12, to aid in the retention of the plaster.

To retain the throat member in adjusted position I have shown the set screws 6, Figs. 1 and 2, and 16, Fig. 4, passing through the base of the rim, to bear against the throat member, but it will be understood that I regard these as merely one convenient form of fastening means, and do not limit myself to such a specific form, nor do I limit myself to a cylindrical throat-member, nor to a bead-like lip, nor in general otherwise than as set forth in the claims, taken in connection with these specifications. It will be understood further that my improvements may be embodied in any desired and suitable form of box and not necessarily in a cover member provided as illustrated with removable masking portions 7 extending before apertures 8 in the walls 9 of a box base-member 10.

It will be observed that the throat member is shown as fitting loosely with respect to the cover aperture, and while a more snugly fitting throat member may be used as occasion may demand, preferably provision will be made for what amounts to a universal adjustment of the throat member within the aperture, a feature which is especially useful when my improvements are applied to boxes for switches, as shown in Figs. 3 and 4; for even though the box be askew, and not level, the throat member may be set therein as at 13 in the box 14 in said figures, so as to present its mouth level and flush with the general surface of the plaster and the switch 15 in proper angular relation to the vertical.

The throat member may be ribbed, spirally or otherwise, as indicated in Fig. 5 at 17, the ribs aiding to maintain the member in adjusted position either by contact with the walls of the cover aperture, or in coöperation with set screws or other projections from said walls. In Fig. 5 the throat member is shown as made of sheet metal, and other material may be used as desired.

I claim:

As a new article of manufacture, a curb for junction boxes or electrical conduit members of the class described, said curb comprising a cylindrical member of sheet metal the material whereof is turned outwardly at one mouth to form an exterior plaster retaining lip, and is curved at its inner mouth to form a non-abrasive shoulder, the body portion of said member being arranged to enter the mouth of said junction box or the like, substantially as described.

In testimony whereof, I have signed my name to this specification, in the presence of two subscribing witnesses.

ADNAH McMURTRIE.

Witnesses:
JOHN SNYDER,
EDWIN J. CARTER.

---

It is hereby certified that the name of the assignee in Letters Patent No. 882,337, granted March 17, 1908, upon the application of Adnah McMurtrie, of New York, N. Y., for an improvement in "Junction-Boxes for Electrical Conduits," was erroneously written and printed "Thomas and Betts," whereas the said name should have been written and printed *Thomas & Betts Company;* and that the said Letters Patent should be read with this correction therein that the same may conform to the record of the case in the Patent Office.

Signed and sealed this 2nd day of June, A. D., 1908.

[SEAL.]

C. C. BILLINGS,
*Acting Commissioner of Patents.*

It will be observed that the throat member is shown as fitting loosely with respect to the cover aperture, and while a more snugly fitting throat member may be used as occasion may demand, preferably provision will be made for what amounts to a universal adjustment of the throat member within the aperture, a feature which is especially useful when my improvements are applied to boxes for switches, as shown in Figs. 3 and 4; for even though the box be askew, and not level, the throat member may be set therein as at 13 in the box 14 in said figures, so as to present its mouth level and flush with the general surface of the plaster and the switch 15 in proper angular relation to the vertical.

The throat member may be ribbed, spirally or otherwise, as indicated in Fig. 5 at 17, the ribs aiding to maintain the member in adjusted position either by contact with the walls of the cover aperture, or in coöperation with set screws or other projections from said walls. In Fig. 5 the throat member is shown as made of sheet metal, and other material may be used as desired.

I claim:

As a new article of manufacture, a curb for junction boxes or electrical conduit members of the class described, said curb comprising a cylindrical member of sheet metal the material whereof is turned outwardly at one mouth to form an exterior plaster retaining lip, and is curved at its inner mouth to form a non-abrasive shoulder, the body portion of said member being arranged to enter the mouth of said junction box or the like, substantially as described.

In testimony whereof, I have signed my name to this specification, in the presence of two subscribing witnesses.

ADNAH McMURTRIE.

Witnesses:
JOHN SNYDER,
EDWIN J. CARTER.

---

It is hereby certified that the name of the assignee in Letters Patent No. 882,337, granted March 17, 1908, upon the application of Adnah McMurtrie, of New York, N. Y., for an improvement in "Junction-Boxes for Electrical Conduits," was erroneously written and printed "Thomas and Betts," whereas the said name should have been written and printed *Thomas & Betts Company;* and that the said Letters Patent should be read with this correction therein that the same may conform to the record of the case in the Patent Office.

Signed and sealed this 2nd day of June, A. D., 1908.

[SEAL.]

C. C. BILLINGS,
*Acting Commissioner of Patents.*

It is hereby certified that the name of the assignee in Letters Patent No. 882,337, granted March 17, 1908, upon the application of Adnah McMurtrie, of New York, N. Y., for an improvement in "Junction-Boxes for Electrical Conduits," was erroneously written and printed "Thomas and Betts," whereas the said name should have been written and printed *Thomas & Betts Company;* and that the said Letters Patent should be read with this correction therein that the same may conform to the record of the case in the Patent Office.

Signed and sealed this 2nd day of June, A. D., 1908.

[SEAL.]

C. C. BILLINGS,
*Acting Commissioner of Patents.*